United States Patent [19]

Kallenbach

[11] 4,136,824
[45] Jan. 30, 1979

[54] DEVICE USING OIL FOR HEATING THE OPERATOR'S CAB OF A MACHINE

[75] Inventor: Heinz-Dieter Kallenbach, Cologne, Fed. Rep. of Germany

[73] Assignee: Klöckner-Humboldt-Deutz Aktiengesellschaft, Cologne, Fed. Rep. of Germany

[21] Appl. No.: 800,704

[22] Filed: May 26, 1977

[30] Foreign Application Priority Data

May 26, 1976 [DE] Fed. Rep. of Germany ....... 2623621

[51] Int. Cl.² .......................... B60H 1/14; F01P 11/08; F16N 39/02
[52] U.S. Cl. .................. 237/12.3 R; 60/456; 184/104 B
[58] Field of Search ...................... 237/12.3 R; 60/456; 184/6.22, 104 B; 123/196 AB; 244/57, 118 P

[56] References Cited

U.S. PATENT DOCUMENTS 3,465,847  9/1969  Donath et al. ................ 123/196 AB

FOREIGN PATENT DOCUMENTS 1480396  5/1969  Fed. Rep. of Germany ..... 237/12.3 R
2052894  9/1976  Fed. Rep. of Germany ..... 237/12.3 R
352347  7/1931  United Kingdom ................. 184/104 B
502396  3/1939  United Kingdom ............. 123/196 AB Primary Examiner—John J. Vrablik
Attorney, Agent, or Firm—Walter Becker

[57] ABSTRACT

A device using oil for heating the operator's cab of a machine driven by an air-cooled internal combustion engine, especially the operator's cab of a vehicle. The lubricating oil of the internal combustion engine is re-cooled in an oil cooler and is entirely or partially branched off from the oil cooler and is fed through valves, regulating and control devices to a heat exchanger in the operator's cab. The device includes a manually adjustable rotary valve for opening and closing the heating system together with two oil pressure dependent bypass valves in the heating circuit and with a bypass valve for a lubricating oil filter from a compact valve block. The valve block together with a support for the lubricating oil filter is designed as a one-piece housing and is flanged to the machine housing. Connecting bores for the supply and return conduits to the heating system in the operator's cab are arranged in the one-piece housing.

11 Claims, 4 Drawing Figures

DEVICE USING OIL FOR HEATING THE OPERATOR'S CAB OF A MACHINE

The present invention relates to a device for heating the operating cab of a machine which is driven by an internal combustion engine, especially the operator's cab of a vehicle, while the lubricating oil of the internal combustion engine is recooled in an oil cooler and is entirely or partially branched off ahead of the oil cooler and conveyed to a heat exchanger in the driver's cab through the intervention of valves, regulating devices, and control devices.

The heating of the driver's cab of vehicles by recooling the heat in the hot lubricating oil is described for instance in German Gebrauchsmuster G 18 75 389. According to the disclosure in the said German gebrauchsmuster, the motor oil cooler is, when hot motor oil is involved interposed in a cooling circuit by means of an overpressure valve and is thus arranged in parallel to the heating system.

This known heating system has the drawback that with particularly cold motor lubricating oil (which is equivalent to high conveying pressures in the conduits) at the same time two heat exchangers adapted to give off heat prevent a fast heating up of the engine and thus considerably delay the desired short hot running period. Thus, the engine is over a longer period of time supplied with cold lubricating oil. While for purposes of avoiding this harmful condition of operation, it is possible to manually turn off the heating by shut-off valves or by a bypass line, it should be kept in mind that in case of operating errors, serious damage will occur.

A cab heating system has become known from German Offenlegungsschrift 20 52 894 according to which when starting from cold condition, the motor cooler remains switched off by a thermostat and solely the heating of the driver's cab remains in the oil circuit. Also with this heating system, the warm running phase is considerably extended so that damages are unavoidable as they occur when starting cold.

With motor oil cooling systems, it has become known (Lindebericht No. 15 June 1963, Pages 25–26) with cold motor and viscous lubricating oil to bypass the lubricating oil cooler in the lubricating oil circuit by a valve until the initially high oil pressure after the warming up of the oil has dropped to a low pressure of about 2.5 bar. Only thereafter, a valve closes the bypass conduit so that the oil which has been warmed up in the meantime can now flow through the oil cooler.

It is, therefore, an object of the present invention to provide a heating system for a driver's cab, which heating system will after a cold start not withdraw any heat during the heating-up phase but will simultaneously in the heating circuit gradually exchange cold lubricating oil and will be independent of servicing errors while the regulating and control devices necessary to this effect can with heating connections later be added to an internal combustion engine.

These and other objects and advantages of the invention will appear more clearly from the following specification in connection with the accompanying drawings, in which:

FIG. 1 diagrammatically shows a lubricating oil circuit which simultaneously serves for heating the driver's cab.

Figure 1:
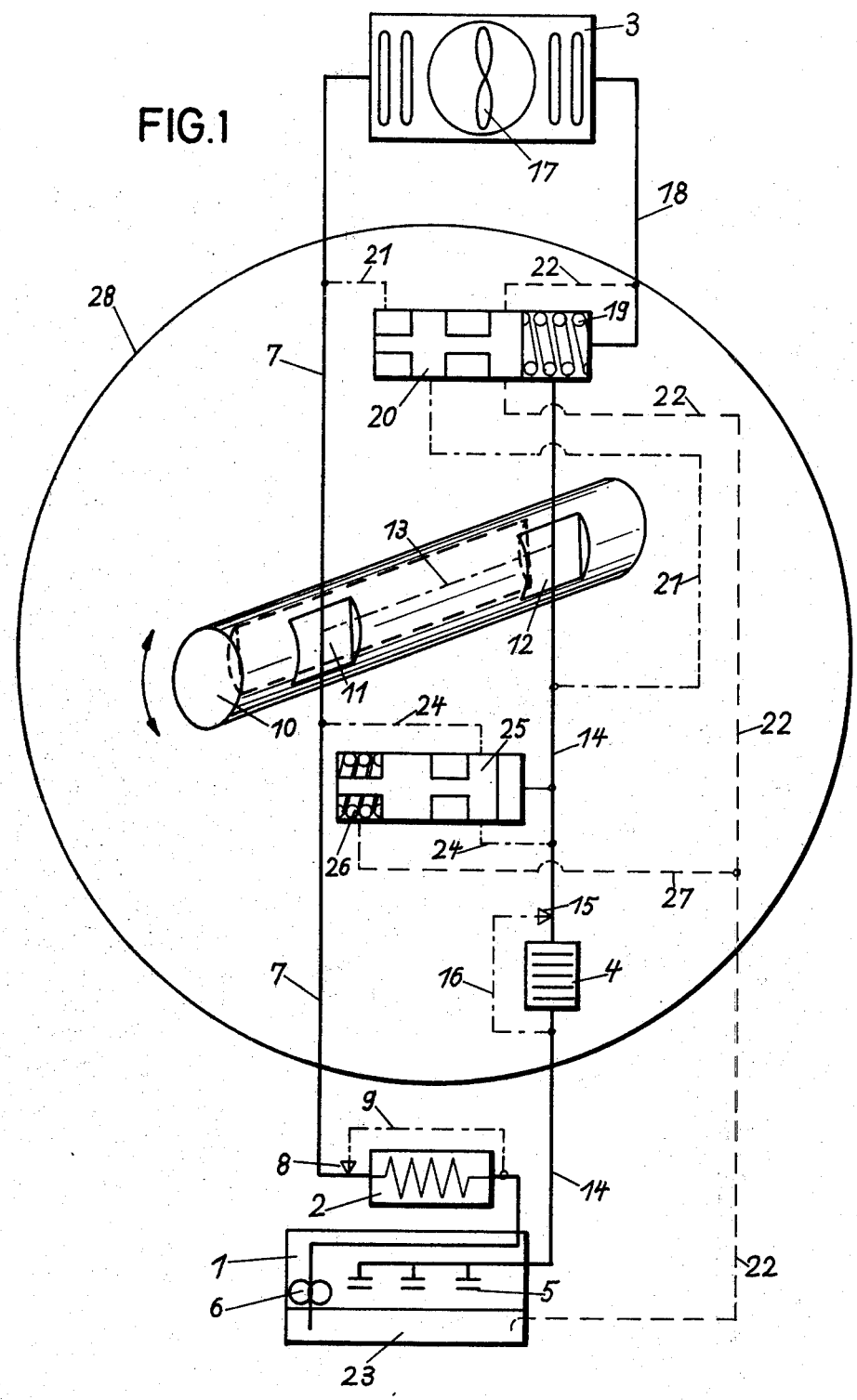

The device according to the invention for heating the operator's cab of a vehicle is characterized primarily in that a manually adjustable rotatable valve for opening and closing the heating system together with two oil pressure dependent bypass valves in the heating circuit and with a bypass valve for a lubricating oil filter are designed as compact valve block which latter together with a support for the lubricating oil filter is designed as a one-piece housing and is flanged to the machine housing. Threaded connecting bores for the feeding and return conduits of the heating system for the driver's cab are arranged in the one-piece housing.

By combining a plurality of functions in a compact housing, the possibility is realized considerably to simplify the manufacture as mounting and functional check in contrast to a design according to which the individual functional elements are distributed in a motor housing over a plurality of places.

A further advantage of the arrangement according to the invention consists in the exchangeability of the housing according to the invention with lubricating oil filter for a filter support as it is employed on internal combustion engines which in the manner of a series are equipped with a commercial exchange filter cartridge. The exchangeability of the heretofore known filter support for the compact housing with the necessary functions for the heating of the driver's cab makes it possible, depending on the purpose of employment of built-in motors, easily to change said built-in motors so that the arrangement may be supported with the same uniform engine throughout a series.

For adjusting the heating system of the driver's cab, there is provided a rotary valve with two passages which are adapted to open and close for the heat feeding and return conduits. The handling of the rotary valve may be effected by remote control from the driver's cab in which instance known means as for instance a linkage system, a cable line, a block and tackle, or an electrical mechanical transmission of the preselected setting is possible.

If by a selected position of the rotary slide, the heat supply and return conduits have been shut off, according to a further development of the invention, there is provided a short circuiting passage which is located in the rotary valve. This passage connects the heat feeding line with the heat return line. In this way, the lubricating oil circuit is limited to the internal combustion engine with oil filter so that with a cold engine, the heating-up phase is reduced. With increasing heating-up of the lubricating oil, the necessary oil cooling alone will be handled by the oil cooler which is opened by a thermostat valve.

In order to be sure that when starting with a cold engine, with the heating means in open condition, no heat will be withdrawn from the lubricating oil by the heating system for the driver's cab, it is suggested according to a further development of the invention to arrange a longitudinal valve slide parallel to the feeding line of the heat, and in flow direction behind the rotary valve. This longitudinal valve slide will, when exceeding a definite set pressure (3 bar), by means of a control edge relieve a bypass conduit from the feeding line of the heat to the return line. This bypass conduit leads in flow direction behind the rotary slide into said return line and by means of an additional control edge frees a discharge conduit arranged parallel to the return conduit.

In view of the advantageous valve system, the heating will be circumvented. By means of the high flow resistance which occurs with cold and viscous lubricating oil, the valve opens so that the lubricating oil in short circuit will through the lubricating oil filter alone supply the motor.

At the same time, when opening the valve by the second control edge, the discharge conduit is freed which in a pressureless manner leads into the oil pan of the internal combustion engine. This opened discharge conduit has the advantage that a small partial flow of the lubricating oil being warmed up exchanges the accumulated oil in the heat exchanger gradually through the discharge conduit.

In order to make sure that at low oil pressures, which occurs with hot lubricating oil and at low speed, the engine is with preference over the heating system for the driver's cap supplied with lubricating oil, it is suggested according to the invention that parallel to the heat return conduit, in flow direction behind the rotary valve, there is arranged a longitudinal valve slide. When exceeding a fixed set pressure, said longitudinal valve slide releases a bypass line to the heat feeding line which bypass line, in flow direction ahead of the rotary valve slide, leads into said heat feeding line. In this way, in flow direction, still ahead of the rotary valve slide, the lubricating oil circuit is short circuited, and the machine is with preference provided with lubricating oil. Operating errors by an incorrectly selected position of the rotary valve for the heating are thus without influence on the supply of lubricant to the motor.

The filtering of the lubricating oil in all conditions of operation is realized by the fact that in the conduit for the heat return flow, in flow direction behind the rotary slide valve and ahead of the entry of the lubricating into distributing lines of the internal combustion engine, a lubricating oil filter with a bypassing valve is arranged. The bypass valve in the filter opens only at very high filter resistance (2.5 bar) as it is to be expected with strong soiling.

In order at a low heat consumption in the driver's cab, to assure a sufficient cooling of the lubricant oil, it is suggested that in the conduit for the supply heating line, in flow direction ahead of the compact housing, there is provided a lubricating oil cooler with bypass line and with thermostatically controlled valve.

Referring now to the drawings in detail, FIG. 1 shows an air-cooled internal combustion engine 1 the lubricating oil of which is circulated through conduits with control and regulating devices while being conveyed to an oil cooler 2 and a heat exchanger 3 in the driver's cab. The oil is then returned through a lubricating oil filter 4 to the internal combustion engine. After entering the engine 1, the cooled and filtered lubricating oil passes through distributing lines to the areas 5 to be lubricated. The flow in the above mentioned circuit is generated by an oil pump 6 driven by the engine 1. When the oil is in hot condition (95° C.), the lubricating oil flows through the oil cooler 2 into the heat feeding line 7. When the lubricating oil is in cold condition, a thermostatically controlled valve 8 keeps the oil cooler 2 closed and conveys the oil flow through the dot-dash bypass line 9 into the heat feeding line 7. The heat feeding or conveying line 7 is controlled by a rotary valve 10 having passages 11, 12 adapted by manual adjustment to open and close the heat feeding line and heat return line.

When the rotary valve 10 is in closed condition, it bridges the feeding line 7 and heat return line 14 by means of a short circuit passage 13 so that the oil can through the lubricating oil filter 4 flow to the consumer areas 5 in the engine. When the lubricating oil filter 4 is clogged up, a valve 15 set for a certain pressure, for instance 2.5 bar, opens and permits the lubricating oil through the dot-dash bypass line 16 to flow to the engine. When the heating system is in open condition as illustrated in FIG. 1, the heated-up lubricating oil passes through the passage 11 and the line 7 to the heat exchanger 3 in the driver's cab (not shown in the drawing). For purposes of speeding up the heat transfer, the heat exchanger 3 may be blown onto by a venting device 17. The cooled-off lubricating oil flows through the return conduit 18 through the slide valve 20 which by means of a spring and the pressure in the return line 18 is kept open, and furthermore passes through passage 12 in valve 10 into that portion of the return line 14 which through the lubricating oil filter 4 passes through the lubricating areas 5 of the internal combustion engine 1.

If the internal combustion engine is started while the plant is in cold condition, and while low outside temperatures prevail, it is, for a fast warming-up of the engine desirable that neither the oil cooler 2 nor the heat exchanger 3 is turned on. For this reason, the oil cooler 2 is kept closed by the thermostatically controlled valve 8. Similarly, in view of the lubricating oil pressure building up in the conduits and in the heat exchanger 3, the pressure in the line 7 becomes so high that in view of the bypass line 21, the slide valve 20 is opened against the thrust of spring 19 and the pressure in the return line 18, and the lubricating oil can flow to the return line 14. A smaller portion of the lubricating oil flow, however, passes onto the heat exchanger 3 and gradually moves the stopped oil through the heat return conduit 18 and the discharge conduit 22 to the oil pan 23 of the internal combustion engine, said discharge conduit 22 having been opened by a second control edge of the slide valve. In the internal combustion engine, the cold oil mixes with the greater quantity of oil in the oil pan so that no material cooling-off will occur in the oil pan 23. With the gradual exchange of the viscous cold oil in the heat exchanger 3, the differential pressure on both sides of the slide valve 20 drops so that eventually the heating system of the heat exchanger 3 is turned on by closing the valve 20 as shown in the drawing.

In contradistinction to the showing in FIG. 1, the slide valve 20 may also, when viewed in the flow direction in line 7, be arranged ahead of the rotary valve 10 without any change in the function of the system.

A particularly expedient and space-saving arrangement is obtained when the slide valve 20 is arranged in the tubular rotary valve 10. However, in such an instance it is necessary in the rotary valve 10 to provide openings in the wall for the inlet and discharge to the slide valve 20.

In this way, an automatic device is obtained which assures a short heating-up phase of the engine while the latter is cold, even when an operating error occurred and when the heating device is open while the engine is cold.

At rather low temperatures and with hot lubricating oil, the thermostat 8 switches on the lubricating oil cooler 2 at about 95° C. so that only when the heat requirement of the driver's cab is fully met, an additional cooling of the lubricating oil will occur.

With internal combustion engines, it is known that with hot lubricating oil, the lubricating oil pressure drops relative to a condition in which the lubricating oil is only slightly warmed up. If this slight oil viscosity is accompanied by a low speed of operation, for instance low idling speed, the pressure drops further. In order to assure that in such a condition of operation the heating of the driver's cab will not further reduce the lubricating oil pressure, the, line 7 has when viewing in flow direction, arranged the dot-dash bypass line 24 ahead of the rotary valve 10, said bypass line 24 being controlled by the slide valve 25. With decreasing lubricating oil pressure in the return line 14, for instance 2 bar, the helical coil spring 26 moves the valve slide against the decreasing oil pressure and thus opens the bypass line 24. As a result thereof, as long as insufficient lubricating oil pressure is available, the heating system for the driver's cab is bypassed, and the supply of the internal combustion engine with lubricating oil is effected with preference.

With increasing lubricating oil pressure which has built up and extends up to the return line 14, the liquid pressure will through the intervention of the valve slide overcome the helical coil spring 26 and close the valve 25 so that the heating system for the driver's cab is again applied with lubricating oil.

Leakage oil which has passed along the valve slide into the space behind the valve slide is through the discharge line 27 in a pressureless condition conveyed to the oil pan 23 of the internal combustion engine 1. In a similar manner, in contradistinction to the illustration of the slide valve 20 and independent of the leakage oil collecting on the rotary valve 10 is likewise returned to the oil pan 23 through the line 22.

For purposes of a simple manufacture and checking of the functions of the device, there is provided a compact housing 28 in which have been combined the devices 20, 13, 25, 4 and the pertaining conduits. The lubricating oil filter 4 is as so-called alternating filter screwed on the said housing 28. It is particularly advantageous that the housing 28 (FIG. 2) is exchangeable for a customary filter base flanged to the motor. In this way, there exists the possibility with motors produced in great quantities and with the same design, whenever desired, to exchange the filter base in order to build in a heating system for the driver's cab.

Figure 2:
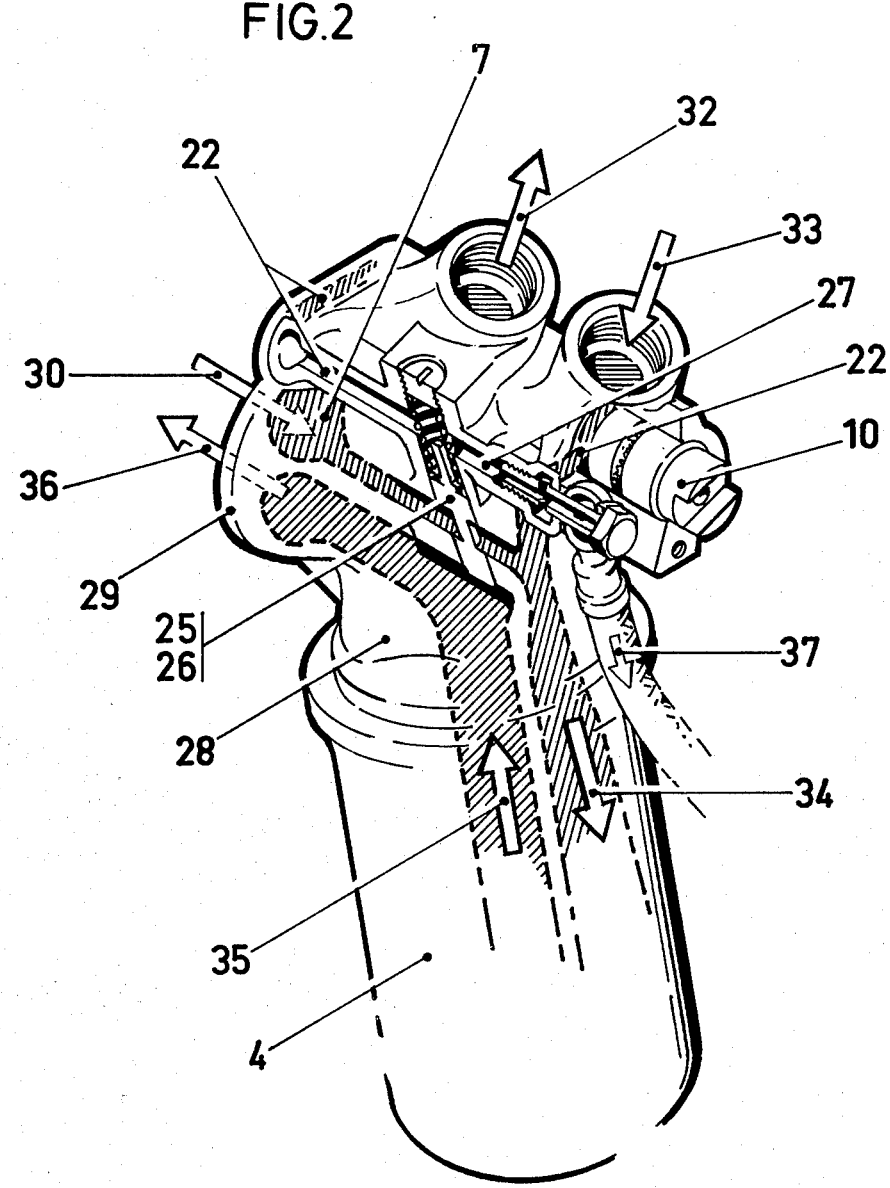
FIG. 2 illustrates partly in perspective and partly in section the housing for the lubricating oil filter as seen from one side.

FIG. 2 clearly shows that for direct connection to the internal combustion engine, (FIG. 1) there serves the flange 29 which establishes the connection of the lubricating oil lines from and to the housing 28.

The entry of the lubricating oil into housing 28 is indicated by the arrow 30. The shaded field into which the arrow 30 extends, corresponds to the line 7 in FIG. 1. This line 7 branches on one hand to the bypass valve 25, 26, and on the other hand toward the through-put opening 11 in the rotary valve 10 (FIG. 3), and further toward the threaded bore 32. The bore 32 serves for connecting the not further illustrated extended line 7 which leads to the heat exchanger 3 (FIG. 1) in the non-illustrated driver's cab.

Threaded bore 33 serves for connecting the return line 18 (FIG. 1) which leads from the heat exchanger 3 (FIG. 1) in the non-illustrated driver's cab to the housing 28. From the threaded bore 33 the oil flow passes through the passage 12 (not visible) in the rotary valve 10, and through the valve 19, 20 in conduit 14 to the lubricating oil filter 4. The oil flow in the conduit 14 is indicated by the arrow 34 in the shaded field.

The lubricating oil filter may, for instance, be an exchange screen or plate-type filter. After passing through the filter surfaces, the purified lubricating oil flows through the conduit 14 as indicated by the arrow 35 in the shaded field and through the flange connection 29 to the internal combustion engine 1 (FIG. 1). The transfer to the flange connection is illustrated by the arrow 36 in the shaded field.

For purposes of simplification, the bypass valve 15, for briding the lubricating oil filter 4, is not illustrated.

In order to remove the leakage oil which leaks through the sealing gaps of the slide valve 19, 20 and 25, 36 and also leaks through the sealing gaps of the rotary slide 10 into the dead chambers, there are provided conduits 22 and 27 illustrated in part by shading. These conduits 22 and 27 unite in the hose line indicated by the arrow 37 which hose line, as shown in FIG. 1 leads into the oil pan 23 of the internal combustion engine.

Figure 3:
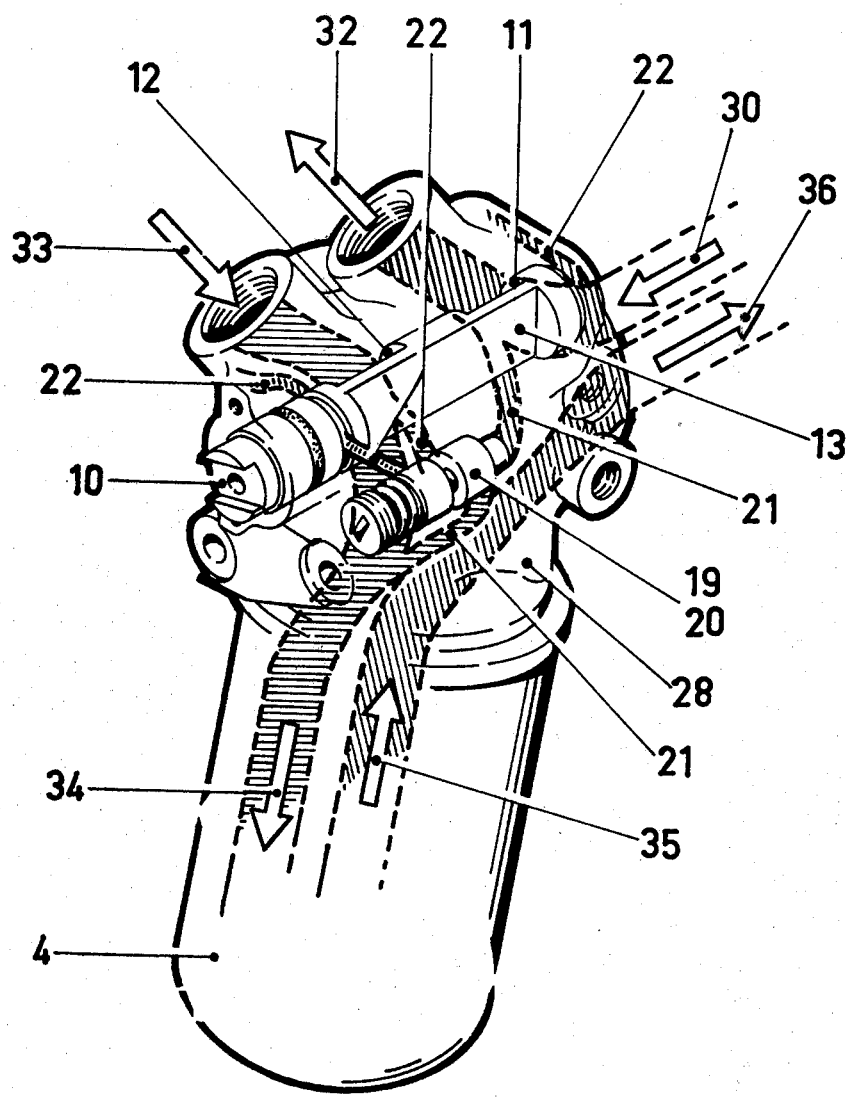
FIG. 3 is a perspective view and partially a section of the housing for the lubricating oil filter of FIG. 2 but seen from the opposite side shown in FIG. 2.

FIG. 3 shows the housing on the side opposite to that of FIG. 2. The course of the conduits is the same as shown in FIG. 2. However, the arrangement of the rotary slide valve 10 with the passages 11, 12 and the short circuit passage 13 differ from those of FIG. 2. More specifically, the connection of the slide valve 19, 20 with the line 7 indicated by the arrows 30 and 32 is established by the line 21 shown shaded. In the same manner, the connection of the slide valve 19, 20 with the heat return line indicated in part by the arrows 33 and 34 is established by the shaded line 22. Contrary to the illustration, the line 21 may also be branched off ahead of the rotary valve 10 to the slide valve 19, 20.

Figure 4:
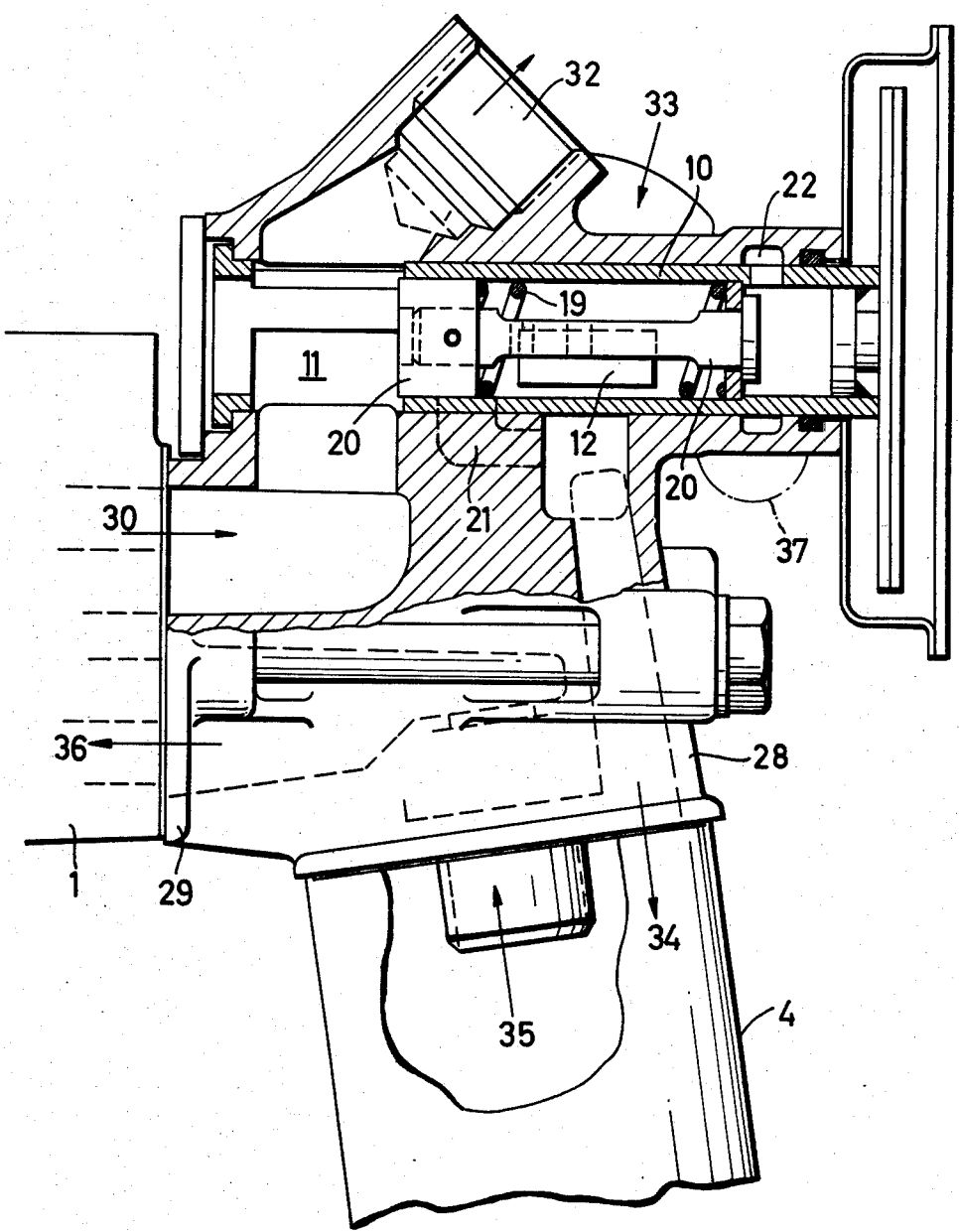
FIG. 4 illustrates the housing for the lubricating oil filter partially in section through the bore for a rotatable valve.

FIG. 4 shows the housing 28 partially in section through the bore for the rotary valve 10.

In the tubular rotary valve 10, the valve slide 20 is longitudinally displaceably mounted. The function is clearly evident from the description of FIG. 1.

It is, of course, to be understood that the present invention is, by no means, limited to the specific showing in the drawing, but also comprises any modifications within the scope of the appended claims.

What I claim is:

1. A system for supplying heat to the operator's compartment of an internal combustion engine driven vehicle comprising in combination: a heat exchanger for supplying heat to the operator's compartment, a lubricating system for the engine including a pump having the suction side connected to the engine oil sump, a supply conduit leading from the discharge side of the pump to said heat exchanger and a return conduit leading from said heat exchanger to the oil sump, a control valve common to said conduits being a manually adjustable rotary valve member to open and close conduits respectively for heat feeding and heat return with one position in which said conduits are connected to said heater exchanger and a second position in which the conduits are connected together and bypass the heat exchanger, a normally closed bypass valve interposed between said conduits on each side of said control valve and each movable into open position in response to a predetermined pressure in a respective one of said conduits, said valves being combined with a unitary valve block having support means for an oil filter and flange means for connection of the block to the engine, said block also including means for receiving said supply and return conduits, said system after a cold start avoiding withdrawal of any heat during a heating phase though simultaneously for heating in a fool proof manner gradually exchanging cold lubricating oil independent of servicing errors, said system capable of being added later to an internal combustion engine.

2. A system in combination according to claim 1 which includes means remote from said block for actuating said control valve into the respective positions thereof.

3. A system in combination according to claim 1 in which said bypass valves comprise slide valve members spring urged in one direction and each operable to move in the other direction in response to a predetermined pressure in a respective one of said supply and return conduits.

4. A system in combination according to claim 1 in which said control valve comprises a rotary valve member which is tubular and at least one of said bypass valves comprises a reciprocable valve member mounted inside said tubular rotary valve member.

5. A system in combination according to claim 1 in which said supply and return conduits comprise passages in said engine and block which communicate when the block is mounted on the engine.

6. A system in combination according to claim 1 in which one of said bypass valves is connected in controlling relation to a bypass conduit which extends from the supply conduit on the upstream side of the control valve to the return conduit on the downstream side of the control valve, said one bypass valve moving to open position in response to a predetermined pressure in said return conduit.

7. A system in combination according to claim 1 which includes a normally closed bypass valve in said block connected in parallel to an oil filter supported on said block and adapted to open in response to a predetermined pressure drop across the filter.

8. A system in combination according to claim 1 which includes an oil cooler in said supply conduit upstream from said control valve, and a thermostatically controlled bypass means connected in parallel with said oil cooler.

9. A system in combination according to claim 1 in which said engine is an air cooled engine.

10. A system in combination according to claim 1 in which said control valve comprises a valve member rotatable in said block.

11. A system in combination according to claim 10 in which said rotary valve member has a tangential notch for each conduit effective in said one position of the rotary valve and an axial notch which is effective in said second position of said rotary valve.

* * * * *